Patented June 14, 1949

2,473,390

UNITED STATES PATENT OFFICE 2,473,390

BUTADIENE EMULSION POLYMERIZATION PROCESS, INCLUDING MERCAPTAN AND CYANIDE MODIFIERS

Harold J. Rose and Marian Kabler Rowan, Baton Rouge, La., assignors to Standard Oil Development Company, a corporation of Delaware No Drawing. Application August 26, 1944, Serial No. 551,424

4 Claims. (Cl. 260—84.5)

This invention pertains to the production of synthetic rubber-like materials by the polymerization of certain unsaturated materials in aqueous emulsion.

Synthetic rubber-like materials have been prepared for some time by polymerizing conjugated diolefin hydrocarbons of 4 to 6 carbon atoms, such as butadiene-1,3, isoprene, dimethylbutadiene and the like, singly or in combination or in admixture with compounds containing a single C=C linkage and capable of copolymerizing with diolefin hydrocarbons in aqueous emulsion. Such copolymerizable compounds have included styrene, substituted styrenes such as alphamethyl - styrene, para - methyl - styrene, paramethoxy-styrene, para - chloro - styrene, vinylnaphthalene, acrylonitrile, methacrylonitrile, acrylic and methacrylic acid esters such as methyl acrylate and methyl methacrylate, ethyl fumarate and unsaturated ketones such as methylvinyl-ketone. The polymers formed vary from hard resinous materials to soft, rubber-like materials depending upon the monomers and the proportions in which they are used and the reaction conditions applied. As a rule, the soft rubbery polymers result when the diolefin is the preponderant polymerizable material, provided, of course, that other reaction conditions are right.

A major problem in the preparation of emulsion polymers has been that of speeding up the rate of reaction. While numerous materials or expedients may be applied in order to increase the reaction rate, the bulk of them are objectionable since they injure product quality. For example, the rate of reaction may be increased by using an optimum catalyst concentration or by raising the temperature at which the reaction is conducted. The polymer obtained in either of these ways is not as satisfactory as that obtainable at lower temperatures or in the presence of smaller amounts of catalyst. The most satisfactory polymerization modifiers that have been found to date are aliphatic mercaptans containing more than six and preferably about twelve carbon atoms per molecule, as disclosed in U. S. Patent No. 2,281,613. Although the use of these mercaptans serves to promote or increase the speed of the reaction, there is still a demand that the reaction be further speeded up.

It is the object of this invention to provide the art with a novel method of activating emulsion polymerization reactions.

It is also the object of this invention to activate the emulsion polymerization of diolefins or of mixtures of diolefins with copolymerizable compounds without detrimentally affecting the polymer product quality.

It is a further object of this invention to activate the emulsion polymerization reaction in order to form polymers of good quality at the temperatures usually applied in a shorter time.

It is also the object of this invention to activate the emulsion polymerization reaction in order to form polymers of better quality at lower temperatures in the same or in somewhat shorter time than ordinarily allowed.

These and other objects will appear more clearly from the detailed specification and claims which follow.

We have now found that the production of synthetic rubber-like materials by the emulsion polymerization of diolefins or mixtures of diolefins with copolymerizable materials occurs at a much faster rate and/or at lower temperatures without injury to the product quality if small and critical amounts of a water-soluble cyanide such as sodium or potassium cyanide or other soluble salt of hydrocyanic acid is provided in the reaction mixture. The cyanide is preferably added to the reaction mixture as a freshly prepared solution after all other ingredients have been added.

The activating effect of small amounts of soluble cyanides is quite surprising since larger amounts have been used in polymerization recipes and apparently exercised a poisoning effect upon the polymerization. Such a recipe is disclosed in an article by Mueller in "India Rubber World," volume 107, October, 1942, pages 33–35. Several runs were made using the following recipe with check runs on each in which the potassium cyanide was omitted. The recipe used was as follows:

| Reactants | Parts | Grams per pressure bottle charge |
|---|---|---|
| Butadiene | 50 | 100. |
| Acrylonitrile | 50 | 100. |
| Water | 125 | 250. |
| Sodium phosphate | 1 | 4.64 ($Na_3PO_4.12H_2O$). |
| Citric acid | 0.5 | 1.09 (Citric acid. $H_2O$). |
| Aquarex D | 1.5 | 3.0. |
| Potassium cyanide | 0.1 | 0.2. |
| Carbon tetrachloride | 1.5 | 3.0. |
| Sodium Perborate | 0.075 | 0.28 ($NaBO_3.4H_2O$). |
| Acetaldehyde | 0.3 | 0.6. |

The data obtained using the recipe shown above are not in accord with the 3–5 hour reaction time at room temperature as reported in Mueller's article. In addition, the reaction proceeded at a faster rate in the absence of KCN than it did when KCN was used in the concentration recorded above. Data from two sets of bottle experiments are shown below:

| Run | Per Cent KCN | Per Cent Conver. | Time |
|---|---|---|---|
| | | | Hours |
| BE-43-1 | 0.0 | 2.1 | 4 |
| 2 | 0.0 | 2.2 | 4 |
| 3 | 0.1 | Oily Polymer | 4 |
| 4 | 0.1 | do | 4 |
| BE-44-1 | 0.1 | do | 15 |
| 2 | 0.1 | do | 15 |
| 3 | 0 | 13.4 | 15 |
| 4 | 0 | 8.1 | 15 |

These data clearly show that 0.1% of potassium cyanide based on reactants does not accelerate the copolymerization of butadiene and acrylonitrile in aqueous emulsion but instead "poisons" the reaction.

This invention is applicable to the production of emulsion polymers of conjugated diolefins, such as butadiene, isoprene, piperylene, dimethyl-butadiene or the like, used singly or mixtures of such diolefins, as well as mixtures of conjugated diolefins, such as butadiene or isoprene, with copolymerizable materials containing a single C=C linkage such as styrene, alpha-methyl-styrene, para-methyl-styrene, alpha-methyl, para-methyl styrene, para-chloro-styrene, acrylonitrile, methacrylonitrile, chloroacrylonitrile, acrylic acid esters such as methyl acrylate or methyl methacrylate and unsaturated ketones such as methyl vinyl ketone and the like.

The polymerization is ordinarily effected by dispersing one part of the monomers in from about one and one-half to two parts of water containing a suitable emulsifying agent, polymerization catalyst and mercaptan polymerization modifier.

The emulsifiers employed are the alkali metal or ammonium salts of higher molecular weight fatty acids such as oleic acid, stearic acid, Distal acids and the like, alkali metal salts of alkylated sulfonic acids or fatty alcohol sulfates, for example, sodium salts of isobutyl naphthalene sulfonic acid, tetraisobutenyl sulfonic acid and also acid addition salts of high molecular amines such as dodecyl amine hydrochloride or acetate and the like. The amount of emulsifier used is ordinarily about 0.5 to about 5 weight per cent based on the monomers.

The catalysts which may be used in the polymerization are substances which are capable of liberating oxygen under the conditions employed in the polymerization and include such compounds as hydrogen peroxide, benzoyl peroxide, alkali metal or ammonium perborates and persulfates, or the like. The amount of catalyst is ordinarily about 0.05 to about 0.6 weight per cent based upon the monomers present.

The polymerization modifiers provided in our reaction mixture are the higher molecular aliphatic mercaptans, i. e., containing more than about six carbon atoms per molecule, such as octyl, dodecyl and "Lorol" mercaptan. "Lorol" mercaptan is a mixture of mercaptans consisting of approximately 55% of $C_{12}$, 30% of $C_{14}$ and 15% of $C_{16}$ mercaptans. Tertiary mercaptans such as diisobutyl mercaptan, or aromatic mercaptans, may also be used. The amount of modifier used is ordinarily about 0.2 to about 1.0 weight per cent based upon the monomers used.

The cyanides that may be used to activate the emulsion polymerization reaction in accordance with the present invention are sodium or potassium cyanide or any other water-soluble salts of hydrocyanic acid such as ammonium, calcium, barium or magnesium cyanide. The amount of activator used is very small, varying between about 0.0005 and about 0.02 weight percent of the cyanide ion based upon the monomers.

The following examples are illustrative of the present invention but it is to be understood that our invention is not limited thereto:

EXAMPLE 1

A copolymer of butadiene and acrylonitrile was prepared in a King #1 syphon bottle according to the following recipe:

| | Parts | Grams per bottle |
|---|---|---|
| Butadiene | 74 | 148 |
| Acrylonitrile | 26 | 52 |
| Water | 200 | 400 |
| Oleic acid | 5 | 10 |
| Sodium hydroxide (to neutralize 80% of oleic acid) | | 1.14 |
| Potassium persulfate | 0.3 (or as given) | 0.6 |
| Lorol mercaptan | 0.5 (or as given) | 1.0 |

The oleic acid was dissolved in the acrylonitrile and this solution was added to the dilute alkali already in the bottle. These two solutions were thoroughly mixed after which catalyst solution and mercaptan were added to the emulsion. At this point butadiene was introduced to the bottle reactor. The bottle was then placed in a water bath where it was subjected to tumbling type agitation for the recorded periods of time. The temperature was maintained at 95° F. except where otherwise stated.

The foregoing experiment was repeated several times using identical materials except that varying small amounts of a freshly prepared 0.016% cyanide (equivalent to 0.04% KCN) solution were added to the reaction mixture just before the butadiene was charged.

Another series of similar experiments was conducted using constant amounts of cyanide and catalyst and varying amounts of mercaptan.

In addition, another series of experiments was carried out using constant amounts of cyanide and mercaptan and varying amounts of catalyst.

The polymer produced in each of these runs was separated by coagulating the latex obtained with saturated brine and adjusting the particle size with carbon dioxide. The crumb rubber was then washed thoroughly on a filter and reslurried in warm water in order to remove brine and soap. The polymer was then dried at approximately 180° F. for 8 hours and then weighed. The percent conversion of hydrocarbons to dried polymer was obtained by comparing the weight of rubber prepared with the original 200 grams of reactants in direct proportion. Each product was then compounded according to the following recipe and cured for 60 minutes at 287° F.

| | Parts |
|---|---|
| Polymer | 100 |
| Zinc oxide | 5 |
| Stearic acid | 1 |
| Benzothiazyl disulfide | 1 |
| Sulfur | 1.5 |
| Medium processing Channel Black | 50 |

The resulting vulcanizates were then evaluated. The data obtained are summarized in Tables I, II and III.

TABLE I

*Cyanide activated synthesis of butadiene-acrylonitrile polymers variable cyanide concentration*

| Run | KCN | Mercaptan | $K_2S_2O_8$ | Conversion | Reaction Time | Conversion per hour | Tensile | Elong. | 300% Modulus | Williams Plast. Masticated |
|---|---|---|---|---|---|---|---|---|---|---|
| | Per Cent | Per Cent | Per Cent | Per Cent | | Per Cent | | Per Cent | | |
| BE-7-2 | 0 | 0.65 | 0.3 | 63.0 | 13.25 | 4.7 | ---- | ---- | ---- | 133-32 |
| 5 | 0.005 | 0.65 | 0.3 | 70.5 | 7.25 | 9.7 | 4,500 | 625 | 1,125 | 100-10 |
| 8 | 0.01 | 0.65 | 0.3 | 67.5 | 6.25 | 10.8 | 4,550 | 560 | 1,300 | 117-12 |
| 11 | 0.015 | 0.65 | 0.3 | 69.5 | 8.75 | 7.9 | 4,150 | 510 | 1,500 | 145-68 |
| 14 | 0.02 | 0.65 | 0.3 | 78.5 | 12.50 | 6.3 | 4,250 | 460 | 1,950 | 149-79 |
| BE-8-2 | 0 | 0.65 | 0.3 | 81.0 | 14.75 | 5.3 | 3,550 | 630 | 1,100 | 90-4 |
| 5 | 0.005 | 0.65 | 0.3 | 69.5 | 6.25 | 10.8 | 4,050 | 610 | 1,125 | 91-4 |
| 8 | 0.01 | 0.65 | 0.3 | 73.5 | 7.50 | 9.3 | 4,050 | 620 | 1,300 | 118-12 |
| 11 | 0.15 | 0.65 | 0.8 | 82.0 | 8.75 | 9.1 | 3,750 | 540 | 1,500 | 135-35 |
| 14 | 0.02 | 0.65 | 0.3 | 82.0 | 11.00 | 7.8 | 4,100 | 580 | 1,400 | 133-30 |

TABLE II

*Cyanide activated synthesis of butadiene-acrylonitrile polymers variable mercaptan concentration*

| Run | KCN | Mercaptan | $K_2S_2O_8$ | Conversion | Reaction Time | Conversion per hour | Tensile | Elong. | 300% Modulus | Williams Plast. Masticated |
|---|---|---|---|---|---|---|---|---|---|---|
| | Per Cent | Per Cent | Per Cent | Per Cent | | Per Cent | | Per Cent | | |
| BE-15-1 | 0 | 0.3 | 0.3 | 63.0 | 18.0 | 3.5 | 4,700 | 480 | 2,075 | 159-69 |
| 3 | 0 | 0.5 | 0.3 | 67.0 | 17.5 | 3.8 | 5,200 | 580 | 1,475 | 142-26 |
| 5 | 0 | 0.6 | 0.3 | 66.5 | 17.5 | 3.8 | 4,900 | 580 | 1,450 | 131-15 |
| 7 | 0 | 0.7 | 0.3 | 66.5 | 17.5 | 3.8 | 4,900 | 600 | 1,300 | 120-9 |
| 9 | 0 | 0.8 | 0.3 | 65.5 | 17.0 | 3.9 | 4,550 | 620 | 1,150 | 105-5 |
| 11 | 0 | 1.0 | 0.3 | 69.0 | 17.0 | 4.1 | 4,550 | 620 | 1,175 | 113-12 |
| BE-12-1 | 0.005 | 0.3 | 0.3 | 62.0 | 8.0 | 7.8 | 4,450 | 490 | 1,850 | 130-11 |
| 3 | 0.005 | 0.4 | 0.3 | 59.5 | 7.5 | 7.9 | 4,300 | 530 | 1,500 | 132-14 |
| 5 | 0.005 | 0.5 | 0.3 | 67.0 | 7.0 | 9.6 | 4,500 | 570 | 1,375 | 108-10 |
| 10 | 0.005 | 0.6 | 0.3 | 62.0 | 7.0 | 8.9 | 4,650 | 590 | 1,450 | 120-10 |
| 13 | 0.005 | 0.7 | 0.3 | 62.0 | 7.5 | 8.3 | 4,650 | 610 | 1,250 | 126-14 |
| 15 | 0.005 | 0.9 | 0.3 | 66.0 | 8.0 | 8.3 | 3,700 | 580 | 1,175 | 114-17 |
| BE-14-1 | 0.01 | 0.3 | 0.3 | 62.5 | 8.5 | 7.4 | 4,950 | 470 | 2,150 | 155-57 |
| 3 | 0.01 | 0.4 | 0.3 | 71.5 | 8.5 | 8.4 | 4,850 | 490 | 2,050 | 140-27 |
| 5 | 0.01 | 0.5 | 0.3 | 67.0 | 8.0 | 8.4 | 4,200 | 490 | 1,700 | 132-19 |
| 8 | 0.01 | 0.6 | 0.3 | 65.5 | 8.25 | 7.9 | 4,300 | 530 | 1,575 | ---- |
| 10 | 0.01 | 0.7 | 0.3 | 75.5 | 8.0 | 9.4 | 4,150 | 570 | 1,350 | 108-8 |
| 12 | 0.01 | 0.9 | 0.3 | 67.0 | 8.5 | 7.9 | 4,050 | 520 | 1,550 | 118-9 |
| BE-6-4 | 0.015 | 0.55 | 0.3 | 75.0 | 8.00 | 9.4 | 4,050 | 490 | 1,925 | 145-40 |
| 6 | 0.015 | 0.60 | 0.3 | 75.5 | 7.75 | 9.7 | 4,150 | 510 | 1,625 | 136-26 |
| 9 | 0.015 | 0.65 | 0.3 | 73.5 | 7.75 | 9.5 | 4,350 | 560 | 1,525 | 132-18 |
| 11 | 0.015 | 0.70 | 0.3 | 78.0 | 7.50 | 10.4 | 4,050 | 530 | 1,425 | 129-14 |
| 13 | 0.015 | 0.75 | 0.3 | 78.0 | 7.50 | 10.4 | 3,250 | 470 | 1,475 | 128-10 |
| 15 | 0.015 | 1.00 | 0.3 | 85.0 | 7.50 | 11.3 | 3,150 | 550 | 1,200 | 104-9 |
| BE-10-3 | 0.02 | 0.4 | 0.3 | 81.5 | 11.75 | 6.7 | 4,300 | 560 | 1,325 | 149-29 |
| 5 | 0.02 | 0.5 | 0.3 | 82.5 | 11.75 | 7.0 | 4,300 | 570 | 1,350 | 145-40 |
| 7 | 0.02 | 0.6 | 0.3 | 83.0 | 11.75 | 7.1 | 4,200 | 600 | 1,150 | 137-30 |
| 10 | 0.02 | 0.7 | 0.3 | 82.0 | 11.75 | 7.0 | 3,900 | 610 | 975 | 127-14 |
| 12 | 0.02 | 0.8 | 0.3 | 82.0 | 11.50 | 7.1 | 3,950 | 610 | 1,100 | 123-15 |
| 14 | 0.02 | 1.0 | 0.3 | 83.0 | 11.25 | 7.4 | 3,400 | 640 | 825 | 112-14 |

TABLE III

*Cyanide activated synthesis of butadiene-acrylonitrile polymers variable catalyst concentration*

| Run No. | KCN | RSH | Cat. | Conver. | Reac. Time Hrs. @ ( )° F. | Conv. Per Hr. | Tensile | Elong. | 300% Modulus | Williams Plast. Masticated |
|---|---|---|---|---|---|---|---|---|---|---|
| | Percent | Percent | Percent | Percent | | Percent | | Percent | | |
| BE-19-1 | 0 | 0.6 | 0.1 | [1] 53.5 | 15.75 (92) | 3.4 | 3,850 | 680 | 925 | 71-4 |
| 3 | 0 | 0.6 | 0.2 | [1] 60.5 | 16.00 (92) | 3.8 | 4,350 | 590 | 1,200 | 105-11 |
| 5 | 0 | 0.6 | 0.3 | 64.5 | 15.75 (92) | 4.1 | 4,100 | 630 | 1,100 | 96-4 |
| 7 | 0 | 0.6 | 0.4 | 66.0 | 16.00 (92) | 4.1 | 4,250 | 510 | 1,425 | 136-28 |
| 9 | 0 | 0.6 | 0.6 | 69.5 | 16.00 (92) | 4.3 | 4,150 | 450 | 1,975 | 156-59 |
| 11 | 0 | 0.6 | 0.8 | 74.5 | 16.00 (92) | 4.7 | 4,400 | 500 | 1,775 | 151-80 |
| 13 | 0 | 0.6 | 1.0 | 75.0 | 16.50 (92) | 4.5 | 4,850 | 500 | 1,875 | 172-103 |
| BE-18-1 | 0.005 | 0.6 | 0.05 | [1] 51.0 | 8.5 (95) | 6.0 | 3,900 | 590 | 1,100 | 82-2 |
| 3 | 0.005 | 0.6 | 0.15 | [1] 69.0 | 7.25 (95) | 9.5 | 3,800 | 590 | 1,025 | 94-7 |
| 5 | 0.005 | 0.6 | 0.30 | 71.0 | 9.00 (95) | 7.9 | 4,150 | 490 | 1,675 | 131-17 |
| 7 | 0.005 | 0.6 | 0.40 | 71.5 | 10.50 (95) | 6.8 | 4,050 | 455 | 1,850 | 148-40 |
| 9 | 0.005 | 0.6 | 0.60 | 75.5 | 10.50 (95) | 7.2 | 4,200 | 445 | 2,100 | 153-52 |
| 11 | 0.005 | 0.6 | 0.80 | 77.0 | 12.00 (95) | 6.4 | 4,100 | 400 | 2,500 | 173-77 |
| 13 | 0.005 | 0.6 | 1.00 | 78.0 | 12.00 (95) | 6.5 | 4,025 | 390 | 2,650 | 179-94 |

[1] Considerable gel was observed in these experiments and some of the reactions were consequently terminated at lower conversions than was desired. The formation of the viscous soap-like gel probably would not occur if better agitation were possible for the bottle reactors.

It may readily be seen from the foregoing data that the concentrations of cyanide are quite critical. It is rather difficult, however, to limit the concentrations to a very narrow range since they are dependent to a certain degree on the concentrations of both mercaptan and catalyst and indirectly to the purity of the raw materials since the latter vary the effective catalyst concentration available for the actual polymerization reaction.

EXAMPLE 2

Butadiene-acrylonitrile copolymers were prepared at a temperature of 76° F. both with and without cyanide activation. The polymerization recipe, charging procedure, etc., were identical with those described in Example 1. The data obtained are summarized in Table IV:

TABLE IV

| Run | CN | $K_2S_2O_8$ | Mercaptan | Conver. | Conv. per Hr. | Tensile | 300% Mod. | Elong. | Williams Plast. |
|---|---|---|---|---|---|---|---|---|---|
| | Percent | Percent | Percent | Percent | Percent | | | Percent | |
| BE-38-4 | 0 | 0.3 | 0.45 | 71.0 | 2.8 | 4,200 | | 610 | 95-3 |
| 7 | 0.004 | 0.3 | 0.45 | 77.5 | 4.9 | 4,000 | | 550 | 119-11 |
| BE-40-1 | 0 | 0.3 | 0.45 | 73.0 | 2.7 | 4,000 | 950 | 620 | 90-3 |
| 4 | 0.004 | 0.3 | 0.45 | 80.5 | 5.4 | 4,150 | 1,275 | 540 | 123-10 |
| 7 | 0.004 | 0.15 | 0.45 | 59.5 | 4.0 | 3,800 | 800 | 660 | 73-0 |

These runs show that small amounts of cyanide activates the copolymerization of butadiene-acrylonitrile at lower temperatures, giving a conversion rate of about 4.9–5.4%/hr. as compared to 2.7–2.8%/hr. without activation. It also appears that the activation is effected without substantially affecting the physical properties of the polymer.

EXAMPLE 3

Butadiene-acrylonitrile copolymers were also prepared in a series of pilot plant runs made in a fifty gallon reactor provided with turbo type agitation. The recipe used was as follows:

| | Parts |
|---|---|
| Butadiene | 74 |
| Acrylonitrile | 26 |
| Water | 200 |
| Oleic acid | 5 |
| Sodium hydroxide (to neutralize 73% of oleic acid) | |
| Potassium persulfate | 0.6 |
| Lorol mercaptan | 0.48 |

Total reactants charged—60 lb.

In charging the reactor, the alkali was added to the water, after which the oleic acid followed by the acrylonitrile was added under agitation. Agitation was stopped, and the catalyst and butadiene were charged to the reactor in that order. Finally the mercaptan dissolved in part of the nitrile was pumped in, agitation started, temperature brought up to the required point (95° F. except where specified) and the reaction allowed to proceed.

After the reaction proceeded to approximately 70% conversion, the charge was taken from the reactor to the stripper where it was stabilized with 2% phenyl beta-naphthylamine and the unused reactants were removed by raising the temperature somewhat and passing steam through the latex for a given length of time during which it was kept under vacuum. After being stripped, the latex was passed to the coagulator where it was coagulated with saturated brine and the particle size was adjusted with carbon dioxide. After being thoroughly washed, the crumb polymer was reslurried in warm water several times to remove soap and brine, after which it was dropped on to the filter, and dried at 180° F. for approximately 18 hours. The conversion was determined by weighing the dry polymer obtained from a given weight of latex and comparing this with a curve drawn from calculated percentage of solids versus percentage conversions.

This run was repeated several times using the same recipe, conditions, etc., except that small amounts of freshly prepared 0.55% cyanide solution (equivalent to 1.37% KCN) were added to the reactor just after the butadiene addition.

The polymers obtained in the above fashion were compounded according to the following recipe and cured 45 minutes at 287° F.

| | Parts |
|---|---|
| Polymer | 100 |
| Zinc oxide | 5 |
| Stearic acid | 1.5 |
| Sulfur | 1.5 |
| Benzothiazyl disulfide | 1.25 |
| Diphenyl guanidine | 0.25 |
| Medium processing Channel Black | 45 |
| Coal tar type softener | 4 |
| Wood rosin | 4 |
| Ozokerite | 1.5 |

The vulcanizates so obtained were evaluated and the data obtained are summarized in Table V.

TABLE V

Synthesis of butadiene-acrylonitrile polymers pilot plant operation using cyanide activated system

| Run No. | L-305 | L-310 | L-312 | L-314 | L-315 | L-316 | L-313 [1] |
|---|---|---|---|---|---|---|---|
| Temperature, °F | 95 | 95 | 95 | 95 | 95 | 95 | 95 |
| Hours | 10 | 7.5 | 10.5 | 12.75 | 12 | 11.75 | 15.5 |
| Per cent Conversion | 69.5 | 61 | 71 | 74.5 | 71 | 68 | 69 |
| Tensile, p. s. i. | 3,600 | 3,850 | 3,700 | 3,650 | 3,800 | 3,500 | 3,400 |
| Elongation, per cent | 720 | 650 | 680 | 700 | 700 | 620 | 780 |
| Williams Plast.-Rec. | 109-7 | 121-10 | 114-12 | 134-30 | 110-14 | 129-30 | 123-27 |
| Band, min | 6 | 11 | 9 | 14 | 9 | 13 | 11 |
| Per cent RCN | 27.0 | | 27.4 | 27.1 | 28.1 | | 25.2 |

[1] 0% KCN and 0.58% RSH.

EXAMPLE 4

A copolymer of butadiene and styrene was prepared using pressure bottles (King No. 1 siphon bottles), agitated by rotation on a wheel in a water bath in the usual manner. All the runs were made with the following recipe unless otherwise stated; the parts given are by weight:

| | Parts |
|---|---|
| Butadiene | 75 |
| Styrene | 25 |
| Water | 200 |
| Sodium soap of selectively hydrogenated Distal acid | 6 |
| Potassium persulfate | 0.3 |
| Dodecyl mercaptan | 0.5 |

All runs were made at 40° C. for 16 hours and using 200 grams of reactants. When potassium cyanide was used, it was added as a freshly prepared 0.5% solution and mixed well into the emulsion just prior to the addition of the mercaptan and butadiene. The polymer was separated, dried, compounded and evaluated substantially as described in Example 1. The data obtained are summarized in Table VI below:

TABLE VI

*KCN as promoter for Buna S Synthesis*

| Concn. KCN | Conversion | Mooney Viscosity | Tensile | 300% Mod. | Elongation |
|---|---|---|---|---|---|
| | Per cent | | Pounds | Pounds | Per cent |
| None | 59 (?) | 13 | | | |
| 0.001 | 65.5 | 27 | 2,700 | 940 | 600 |
| 0.002 | 71 | 35 | 3,140 | 1,060 | 630 |
| 0.004 | 78 | 41 | 2,700 | 1,150 | 540 |
| 0.008 | 75 | 31 | 2,800 | 840 | 650 |
| 0.016 | 64.5 | 21 | | | |
| 0.032 | 53 | very soft | | | |
| 0.064 | 54 | very soft | | | |
| 0.128 | 53 | very soft | | | |

It may be observed that above about 0.016% of KCN no acceleration of reaction rate occurs and that there is a maximum conversion obtainable over a range of about 0.002% of KCN. It is obvious from these data that the operable concentration of cyanide is quite critical.

EXAMPLE 5

Butadiene-styrene copolymers were prepared using a selectively hydrogenated Distal acid soap of different degrees of neutralization in order to determine the effect of alkali on the activation of this polymerization by means of potassium cyanide. The following recipe was used in the several runs:

| | Parts |
|---|---|
| Butadiene | 75 |
| Styrene | 25 |
| Water | 200 |
| Sodium soap of selectively hydrogenated Distal acid | 6 |
| Potassium persulfate | 0.3 |
| Dodecyl mercaptan | 0.5 |
| Potassium cyanide | .003 |

All of the runs were at 40° C. for 15 or 16 hours and using 200 grams of reactants. The results obtained are summarized in Table VII.

TABLE VII

| Neutralization of Selectively Hydrogenated Distal Acid | KCN | Reaction Time | Conversion | Mooney Viscosity | Tensile | 300% Modulus | Elongation |
|---|---|---|---|---|---|---|---|
| | Per cent | | Per cent | | | | Per cent |
| 100 per cent | 0.00 | 16 | (?)59 | 13 | | | |
| 85 per cent | 0.003 | 16 | 69.5 | 42 | 2,410 | 720 | 680 |
| 95 per cent | 0.003 | 15 | 73 | | | | |
| 100 per cent | 0.003 | 16 | 69 | 50 | 2,340 | 1,080 | 580 |
| 100 per cent | 0.003 | 15 | 75 | | | | |
| 105 per cent | 0.003 | 16 | 76 | 67 | 2,940 | 820 | 690 |
| 105 per cent | 0.003 | 15 | 79.5 | | | | |
| 115 per cent | 0.003 | 16 | 77 | 60 | 2,760 | 880 | 640 |
| 115 per cent | 0.003 | 15 | 81 | | | | |

These data show that the use of a very slight excess of alkali in conjunction with potassium cyanide appears to be sufficient to give a further improvement in reaction rate.

EXAMPLE 6

Polymers of butadiene alone were prepared in pressure bottle experiments similar to those carried out in the preceding examples. The recipe used in the several runs were as follows:

| | Parts |
|---|---|
| Butadiene | 100 |
| Water | 200 |
| Ivory soap | 5 |
| Potassium persulfate | 0.3 |
| Lorol mercaptan | 0.4 |

The temperature was maintained at 107° F. for the reaction time of 15 hours. The results obtained are summarized in Table VIII below:

TABLE VIII

| Run | KCN [1] | Conversion | Conversion per Hour |
|---|---|---|---|
| | Per cent | Per cent | Per cent |
| BE-41-1 | 0.00 | 60.5 | 4.0 |
| 3 | 0.005 | 82.0 | 5.5 |
| 4 | 0.010 | 92.5 | 6.2 |
| 5 | 0.015 | 89.5 | 6.0 |
| 6 | 0.020 | 85.5 | 5.7 |

[1] Percentage of KCN is on hydrocarbon basis.

The increase in reaction rate obtained is of the same order of magnitude as for the copolymerization of butadiene and acrylonitrile as well as for the copolymerization of butadiene and styrene.

It may readily be seen from the foregoing examples that small, critical amounts of water soluble salts of hydrocyanic acid exert a pronounced activating effect upon the emulsion polymerization of conjugated diolefins and mixtures of conjugated diolefins with copolymerizable compounds.

The foregoing description contains a limited number of embodiments of the present invention. It will be understood, however, that the foregoing examples are merely illustrative of the present invention and that the latter is not limited to the specific conditions described since numerous variations are possible without departing from the scope of our invention as defined by the following claims.

What we claim and desire to secure by Letters Patent is:

1. The process of preparing rubber-like emulsion polymerizates which comprises emulsifying in water a mixture of a major proportion of a conjugated diolefin hydrocarbon of 4 to 6 carbon atoms and a minor proportion of an ethylenically unsaturated comonomer capable of copolymerizing with conjugated diolefins in aqueous emulsion in the presence of 0.5 to 5.0 weight percent based on the monomers of an emulsifier, 0.05 to 0.6 weight percent based on the monomers of an oxygen-liberating polymerization catalyst and 0.2 to 1.0 weight percent based on the monomers of an aliphatic mercaptan polymerization modifier containing 6 to 16 carbon atoms per molecule, and adding thereto 0.005 weight percent based on the monomers of cyanide ion in the form of a water soluble salt of hydrocyanic acid.

2. A process according to claim 1 wherein the emulsifier comprises a fatty acid soap and up to 15 percent more alkali than is necessary for complete neutralization of the fatty acid in the soap, and wherein the ethylenically unsaturated comonomer is styrene.

3. A process according to claim 1 wherein the ethylenically unsaturated comonomer is styrene.

4. The process of preparing rubber-like emulsion polymerizates which comprises emulsifying one part of a mixture of a major proportion of butadiene-1,3 and a minor proportion of acrylonitrile in 1½ to 2 parts of water in the presence of 0.5 to 5.0 weight percent based on the monomers of an alkali soap of a fatty acid, 0.05 to 0.6 weight percent based on the monomers of an oxygen-liberating polymerization catalyst and 0.2 to 1.0 weight percent based on the monomers of an aliphatic mercaptan polymerization modifier containing from 6 to 16 carbon atoms per molecule, and adding thereto 0.005 weight percent based on the monomers of cyanide ion in the form of potassium cyanide.

HAROLD J. ROSE.
MARIAN KABLER ROWAN.

REFERENCES CITED

The following references are of record in the file of this patent:

UNITED STATES PATENTS

| Number | Name | Date |
|---|---|---|
| 2,248,107 | Meisenburg | July 8, 1941 |
| 2,281,613 | Wollthan | May 5, 1942 |
| 2,300,056 | Meis | Oct. 27, 1943 |
| 2,386,735 | Borders | Oct. 9, 1945 |

FOREIGN PATENTS

| Number | Country | Date |
|---|---|---|
| 550,280 | Great Britain | Jan. 1, 1943 |

OTHER REFERENCES

Mueller, India Rubber World, pp. 33–35 and 41 (1942).

Powers, Synthetic Resins & Rubbers (1943), pp. 208–209. (Copy in Division 50.)